United States Patent [19]

Gotoh

[11] Patent Number: 4,913,337
[45] Date of Patent: Apr. 3, 1990

[54] METHOD OF MANUFACTURING DYNAMOELECTRIC MACHINE FRAME

[75] Inventor: Tohru Gotoh, Nagoya, Japan

[73] Assignee: Mitsubishi Denki Kabushiki Kaisha, Japan

[21] Appl. No.: 393,014

[22] Filed: Aug. 11, 1989

Related U.S. Application Data

[63] Continuation of Ser. No. 147,638, Jan. 25, 1988, abandoned, which is a continuation of Ser. No. 826,184, Feb. 5, 1986, abandoned.

[30] Foreign Application Priority Data

Feb. 6, 1985 [JP] Japan .................................. 60-21171

[51] Int. Cl.⁴ ...................... B23K 26/02; B23K 26/14; B23K 31/02
[52] U.S. Cl. ................................ 228/173.6; 228/179; 228/183; 219/121.64
[58] Field of Search ...................... 228/179, 173.6, 183; 219/121.64, 121.14

[56] References Cited

U.S. PATENT DOCUMENTS

| | | | |
|---|---|---|---|
| 2,936,517 | 5/1960 | Brown, Jr. et al. | 228/183 |
| 3,205,560 | 9/1965 | Loehlein | 228/183 |
| 3,397,440 | 8/1968 | Dalin | 228/183 |
| 3,427,427 | 2/1969 | Rudd | 228/183 |
| 4,643,346 | 2/1987 | Gotoh | 228/155 |
| 4,737,612 | 4/1988 | Bruck et al. | 219/121.64 |
| 4,784,312 | 11/1988 | Gotoh | 228/179 |

FOREIGN PATENT DOCUMENTS

40862 3/1977 Japan .................................. 228/183

OTHER PUBLICATIONS

Metals Handbook, Ninth Edition, vol. 6, pp. 647–649 and 663–665, American Society for Metals, 1983.

*Primary Examiner*—Nicholas P. Godici
*Assistant Examiner*—Samuel M. Heinrich
*Attorney, Agent, or Firm*—Leydig, Voit & Mayer

[57] ABSTRACT

A method for manufacturing a dynamoelectric machine frame according to which heat dissipating fins made of metallic sheet bent to provide a joining portion are placed on an outer peripheral surface of a cylindrical frame main body. A laser beam is irradiated in the direction parallel to the contact surface between the portion of the heat dissipating fins to be joined on the frame main body and the outer peripheral surface of the frame main body. Thus, the laser welding of the heat dissipating fins to the frame main body is achieved without large thermal distortion of the frame main body.

10 Claims, 2 Drawing Sheets

FIG. 3a  FIG. 3b
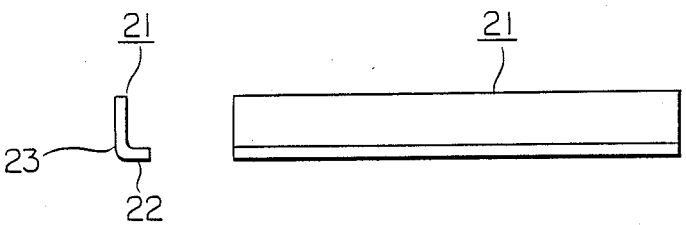
FIG. 4a  FIG. 4b
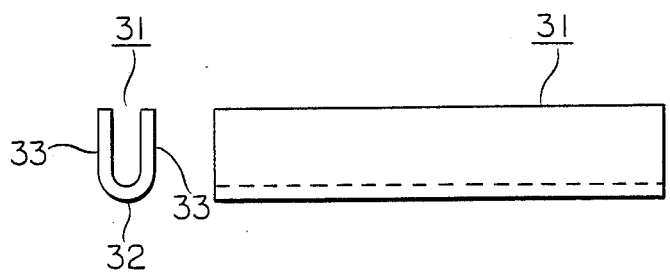
FIG. 5a
PRIOR ART
FIG. 5b
PRIOR ART
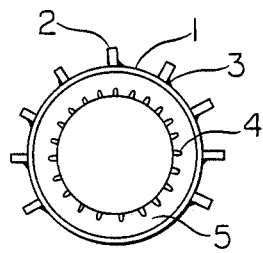
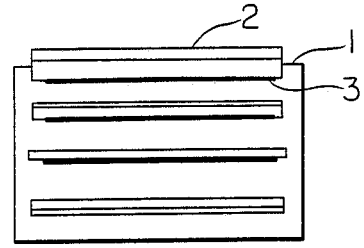

METHOD OF MANUFACTURING DYNAMOELECTRIC MACHINE FRAME

This application is a continuation of application Ser. No. 07/147,638, filed Jan. 25, 1988 an now abandoned, which is a continuation of application Ser. No. 06/826,184, filed Feb. 5, 1986 and now abandoned.

BACKGROUND OF THE INVENTION

This invention relates to a method for manufacturing a frame for a dynamoelectric machine having heat dissipating fins, and more particularly, to a method for joining the heat dissipating fins and the frame main body.

A conventional method for manufacturing a dynamoelectric machine frame will be described taking an electric motor frame as an example.

Generally, when electromagnetic equipment is operated, the temperature of the equipment rises due to its internal power losses. When the temperature rise becomes excessive, the electrical insulation quickly deteriorates which may result in burn-out. For this reason, electric motors are provided with heat dissipating fins on the outer peripheral surface of the frame main body for increasing the air-contacting area to dissipate the inner heat to the exterior, thereby alleviating such temperature rise.

In conventional designs, the electric motor frame is made of cast iron or steel sheet.

However, a large amount of cast iron is needed in the case of the former, and a large amount of thermal energy is consumed for melting the cast iron, resulting in the disadvantage that the manufacturing costs are high.

On the other hand, in the case of the latter, as shown in FIGS. 5a and b, since rectangular heat dissipating fins 2 are welded at a joint 3 on the outer periphery of the frame main body 1 from diagonal direction, the inner periphery of the frame main body 1 is deformed by the thermal distortion due to the welding operation. Therefore, the inner diameter of the frame main body 1 must be machined prior to the insertion of a laminated iron core 5 having slots 4 which acts as a stator into the frame main body 1, resulting in the disadvantage that the manufacture of the frame is complex and expensive. Another disadvantage is its poor appearance due to the weld beads formed on the exterior thereof.

SUMMARY OF THE INVENTION

The present invention has been made in order to solve the above problems, and has as its object to provide a method of manufacturing dynamoelectric machine frames in which thermal distortion is reduced to eliminate the need for machining the inner diameter after welding.

A method for manufacturing a dynamoelectric machine frame according to the present invention is a method wherein heat dissipating fins made of metallic sheet bent to provide a joining portion are placed on an outer peripheral surface of a cylindrical frame main body, and thereafter, a laser beam is irradiated in the direction parallel to the contact surface between the joining portion of the heat dissipating fins to be joined on the frame main body and the outer peripheral surface of the frame main body thereby laser welding the heat dissipating fins to the frame main body.

According to the present invention, since the laser beam is directly irradiated on the contact surface between the heat dissipating fins and the frame main body without penetrating the frame main body, the thermal energy introduced into the frame main body is small and the heat dissipating fins can be secured to the frame main body with a minimum of thermal distortion in the frame main body.

BRIEF DESCRIPTION OF THE DRAWINGS

The invention will become more readily apparent from the following detailed description of the preferred embodiments of the present invention taken in conjunction with the accomanying drawings, in which:

FIGS. 1 and 2 are views for explaining the first embodiments of the present invention, in which FIG. 2b is a side view of FIG. 2a;

FIGS. 3 and 4 are views for explaining the third and the fourth embodiments of the present invention, in which FIG. 3a is a front view of a heat dissipating fin of the second embodiment, FIG. 3b is a side view of FIG. 3a, FIG. 4a is a front view of a heat dissipating fin of the third embodiment, and FIG. 4b is a side view of FIG. 4a; and FIG. 5 is a view for explaining a conventional method, in which FIG. 5a is a front view of the electric motor frame, and FIG. 5b is a side view of FIG. 5a.

PREFERRED EMBODIMENTS OF THE INVENTION

Figures 1A, 1B:
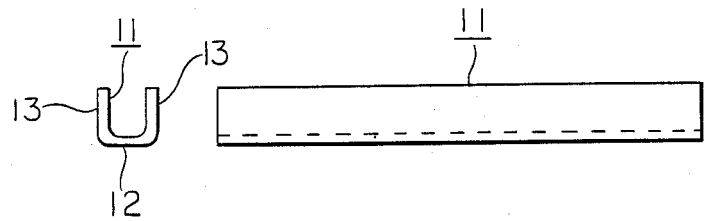
FIG. 1a is front view of a heat dissipating fin.
FIG. 1b, is a side view of FIG. 1a, FIG. 2a is a front view of the apparatus used in carrying out the first embodiment of the present invention.
Figure 2A:
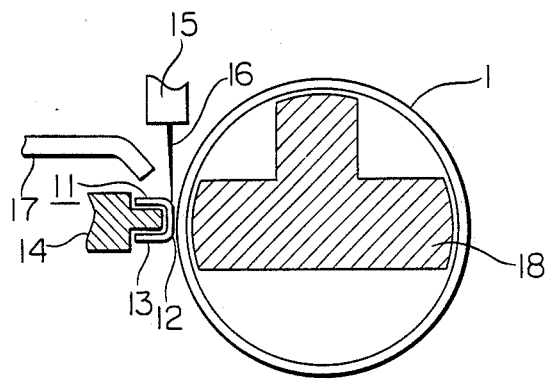
Figure 2B:
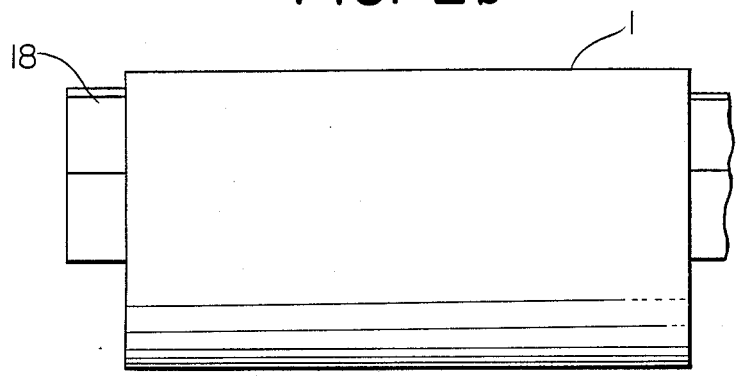

FIGS. 1a and 1b are a front view and a side view illustrating a heat dissipating fin to which the manufacturing method of an electric motor frame is applied, and FIGS. 2a and 2b are a front view and a side view illustrating an apparatus for explaining the manufacturing method of an electric motor frame. In these figures, the same components shown in FIG. 5 are designated by identical reference numerals and their detailed description are omitted. In FIGS. 1 and 2, numeral 11 is a heat dissipating fin, its bottom portion 12 being placed on the frame main body 1 and its contact portion being laser welded.

Next, a description will now be made regarding the manufacturing method of the electric motor frame of the above structure.

First, heat dissipating fins 11 are formed by bending rectangular shaped metallic sheets to have a joining portion 12 to be joined onto a frame main body 1 and an upright portion 13. The thickness of the joining portion 12 and the upright portion 13 will then be equal to the thickness of the metallic sheets. Then, the heat dissipating fins 11 are placed on an outer peripheral surface of the previously prepared cylindrical frame main body 1. As shown in FIG. 2a, the joining portion 12 makes contact with the frame main body 1 tangentially of the cylindrical surface of the frame main body 1. The contact surface between the joining portion 12 and the main body corresponds to the surface of the joining portion 12 and the portion of the surface of the main body 1 facing the joining portion 12. Contact is made between the joining portion 12 and the main body 1 at least along a line of contact running through the middle of the contract surface as a centerline of the joining portion. A laser beam 16 emitted from a laser gun 15 in the direction parallel to the contact surface between the joining portion 12 of the heat dissipating fins to be joined on the frame main body 1 and the outer peripheral surface of the frame main body 1 is irradiated along the contact surface and in a direction tangential to the outer periphery of the frame main body while holding the heat dissipating fins 11 between the mandrel 18 inserted into the frame main body 1 and the fixture 14 for the heat dissipating fin 11. In this way, the contact surface between the outer periphery of the frame main body 1 and the joining portion 12 to be joined is welded. While the width to be joined must be more than about two times the thickness of the upright portion 13, this can be satisfactorily accomplished with a high intensity laser beam.

In FIG. 2a, the reference numeral 17 is a shield gas jet nozzle for blasting an inert gas such as argon, helium or a mixture thereof as a weld shield gas for the purpose of replacing the atmospheric gas around the weld with air and the above gas thereby preventing the weld from oxidizing or nitriding.

The progression of the welding may be made either by the movement of the laser beam or by the movement of the workpiece table. The direction of irradiation of the laser beam relative to the frame main body 1 should be tangential to the outer periphery of the frame main body 1. When the laser beam is irradiated in the radial direction relative to the frame main body 1, a large amount of heat is introduced into the frame main body 1, greatly increasing thermal distortion of the frame main body 1. The frame main body 1 is indexed at predetermined angles and a plurality of heat dissipating fins 11 are welded on the outer peripheral surface of the frame main body 1 to manufacture the electric motor frame.

While no filler metal is used in the above embodiment, when a gap is formed between the portion 12 to be joined and the frame main body 1, or when one of the above two portions to be welded is of a material which easily generates weld defects, a filler metal may be supplied into the molten surface. Depending on the material of the filler wire, $CO_2$ gas or $O_2$ gas may be added to the shield gas. Also, while a constant energy laser beam is generally used in the welding, the input energy may be controlled at a predetermined frequency to prevent thermal distortion.

While the heat dissipation fins of this embodiment have a substantially U-shaped cross section, heat dissipating fins 21 of a substantially L-shaped cross section having a portion 22 to be joined and an upright portion 23 to be projected from the frame main body as shown in FIG. 3 may equally be used. Also, as shown in FIG. 4, a radius may be provided at the outer surface of a joining portion 32 of a substantially U-shaped heat dissipating fin 31 having the joining portion 32 and an upright portion 33 to regulate the area through which the fin is joined.

Further, in the case of the heat dissipating fins shown in FIG. 3, the width of the joint area may be about the same as the thickness of the upright portion 23 to be projected from the frame main body, the cooling effect is reduced to one half of that of the respective heat dissipating fins including two upright portions as shown in FIGS. 1 and 4.

While the description has been made in terms of an embodiment of a method for manufacturing an electric motor frame, dynamoelectric machines other than the electric motor frame may equally be advantageously manufactured by the method of the present invention.

As has been described, according to the present invention, since the laser beam is irradiated in the direction parallel to the contact surface between the portion of the heat dissipating fins to be joined on the frame main body and the outer peripheral surface of the frame main body along the contact surface and in a direction tangential to the outer pheriphery of the frame main body, the laser beam is directly irradiated on the contact surface between the heat dissipating fins and the frame main body without penetrating the frame main body. Accordingly, there is no need for the inner diameter of the frame to be machined except perhaps for some inexpensive tube expansion operation because of small thermal distortion after the heat dissipating fins have been secured to the frame main body.

What is claimed is:

1. A method for manufacturing a dynamoelectric machine frame comprising the steps of:
    forming a heat-dissipating fin having a joining and an upright portion from a metallic sheet, a width of the joining portion being at least twice the thickness of the metallic sheet;
    placing the joining portion of the heat-dissipating fin formed in the step of forming on an outer peripheral surface of a cylindrical main frame body at a contact surface corresponding to the joining portion with a line of contact between the peripheral surface and the joining portion being a centerline of the joining portion;
    irradiating a laser beam in a direction (a) substantially parallel to the contact surface between the joining portion of the heat-dissipating fin placed at the contact surface in the step of placing to be joined on the main frame body and the outer peripheral surface of the main frame body along said contact surface, (b) substantially tangential to the outer peripheral surface of the main frame body at the line of contact, and (c) substantially perpendicular to the line of contact to produce a molten surface substantially equal to the joining portion in width, thereby laser-welding said heat-dissipating fin to said main frame body at the contact surface;
    blasting an inert gas selected from the group consisting of argon and a mixture of argon and helium as a weld shield gas around the weld, thereby substantially preventing the weld from oxidizing or nitriding; and
    supplying filler metal into the molten surface as necessary to fill gaps or weld defects.

2. A method for manufacturing a dynamoelectric machine frame as claimed in claim 1 wherein said heat dissipating fins are formed from rectangular shaped sheets.

3. A method for manufacturing a dynamoelectric machine frame as claimed in claim 1 wherein said step of forming includes bending said metallic sheet to have a U-shaped cross-section to provide said joining portion to be joined to the frame main body and upright portions projecting from the outer peripheral surface of said frame main body.

4. A method for manufacturing a dynamoelectric machine frame as claimed in claim 1 wherein said step of forming includes bending said metallic sheet to have an L-shaped cross-section to provide said joining portion to be joined to the frame main body and said upright portion projecting from the outer peripheral surface of said frame main body.

5. A method for manufactring a dynamoelectric machine frame as claimed in claim 1 wherein said step of forming includes bending said metallic sheet to have a U-shaped cross section to provide said joining portion to be joined to the frame main body and said upright portion projecting from the outer peripheral surface of said frame main body, said joining portion having a radius at its outer surface for regulating the joining area.

6. A method for manufacturing a dynamoelectric machine frame as claimed in claim 1 wherein said step of forming includes bending the metallic sheet to have the joining portion and the upright portion substantially perpendicular to each other, the joining and upright portions each having a thickness equal to the thickness of the metallic sheet, and wherein the width of the joining portion of the heat-dissipating fin is at least twice the thickness of the upright portion.

7. A method for manufacturing a dynamoelectric machine frame comprising the steps of:
forming at least one heat-dissipating fin by forming a metallic sheet into a joining portion and an upright portion, a width of the joining portion being at least twice the thickness of the metallic sheet;
inserting a mandrel into a cylindrical main frame body;
placing said joining portion of said heat-dissipating fin formed in the step of forming on an outer peripheral surface of the cylindrical main frame body at a contact surface with a line of contact between the joining portion and the outer peripheral surface being a centerline of the joining portion while holding said heat-dissipating fin between said mandrel and a fixture;
irradiating a laser beam in a direction (a) substantially parallel to the contact surface between said joining portion of the heat-dissipating fin to be joined on the main frame body and the outer peripheral surface of the main frame body, (b) substantially tangential to said outer peripheral surface of the main frame body at the line of contact, and (c) substantially perpendicular to the line of contact to produce a molten surface substantially equal to the joining portion in width, thereby laser-welding said heat-dissipating fin to said main frame body;
blasting an inert gas selected from the group consisting of argon and a mixture of argon and helium as a weld shield gas around the weld, thereby substantially preventing the weld from oxidizing or nitriding; and
moving one of said laser beam and said main frame body relative to the other along said contact surface, thereby laser-welding said heat-dissipating fin to said main frame body.

8. A method for manufacturing a dynamoelectric machine frame comprising the steps of:
forming a heat-dissipating fin from a metallic sheet by bending the metallic sheet, the heat-dissipating fin having an L-shaped cross-section including a joining portion and an upright portion, a width of the joining portion being at least twice the thickness of the metallic sheet;
placing the joining portion of the heat-dissipating fin formed in the step of forming on an outer peripheral surface of a cylindrical main frame body at a contact surface with a line of contact between the peripheral surface and the joining portion being a centerline of the joining portion; and
irradiating a laser beam in a direction (a) substantially parallel to the contact surface between the joining portion of the heat-dissipating fin to be joined on the main frame body and the outer peripheral surface of the main frammme body along said contact surface, (b) substantially tangential to the outer peripheral surface of the main frame body at the line of contact, and (c) substantially perpendicular to the line of contact to produce a molten surface substantially equal to the joining portion in width, thereby laser-welding said heat-dissipating fin to said main frame body.

9. A method for manufacturing a dynamoelectric machine frame comprising the steps of:
forming a heat-dissipating fin having a joining portion and an upright portion from a metallic sheet, a width of the joining portion being at least twice the thickness of the thickness of the metallic sheet;
placing the joining portion of the heat-dissipating fin formed in the step of forming on an outer peripheral surface of a cylindrical main frame body at a contact surface with a line of contact between the peripheral surface and the joining portion being a centerline of the joining portion, the frame body resting on a workpiece table;
irradiating a laser beam in a direction (a) substantially parallel to the contact surface between said joining portion of the heat-dissipating fin to be joined on the main frame body and the outer peripheral surface of the main frame body along said contact surface, (b) substantially tangential to the outer peripheral surface of the main frame body at the line of contact, and (c) substantially perpendicular to the line of contact to produce a molten surface equal to the joining portion in width, thereby laser-welding said heat-dissipating fin to said main frame body;
moving the laser beam for progression of the welding along the contact surface; and
blasting an inert gas selected from the group consisting of argon and a mixture of argon and helium as a weld shield gas around the weld, thereby substantially preventing the weld from oxidizing or nitriding.

10. A method for manufacturing a dynamoelectric machine frame comprising the steps of:
forming a heat-dissipating fin having a joining portion and an upright portion from a metallic sheet, a width of the joining portion being at least twice the thickness of the metallic sheet;
placing the joining portion of the heat-dissipating fin formed in the step of forming on an outer peripheral surface of a cylindrical main frame body at a contact surface with a line of contact between the peripheral surface and the joining portion being a centerline of the joining portion, the frame body resting on a workpiece table;
irradiating a laser beam in a direction (a) substantially parallel to the contact surface between said joining portion of the heat-dissipating fin to be joined on the main frame body and the outer peripheral surface of the main frame body along said contact surface, (b) substantially tangential to the outer peripheral surface of the main frame body at the line of contact, and (c) substantially perpendicular to the line of contact to produce a molten surface substantially equal to the joining portion in width, thereby laser-welding said heat-dissipating fin to said main frame body;
moving the workpiece table for progression of the welding along the contact surface; and
blasting an inert gas selected from the group consisting of argon and a mixture of argon and helium as a weld shield gas around the weld, thereby substantially preventing the weld from oxidizing or nitriding.

* * * * *

UNITED STATES PATENT AND TRADEMARK OFFICE
CERTIFICATE OF CORRECTION

PATENT NO. : 4,913,337

DATED : April 3, 1990

INVENTOR(S) : Gotoh

It is certified that error appears in the above-identified patent and that said Letters Patent is hereby corrected as shown below:

Column 4, line 16, after "joining" insert --portion--;

Column 5, line 66, change "framme" to --frame--.

Signed and Sealed this

Twenty-fifth Day of June, 1991

*Attest:*

HARRY F. MANBECK, JR.

*Attesting Officer*     *Commissioner of Patents and Trademarks*